HYDROCARBON DESORPTION PROCESS
Original Filed Feb. 13, 1956 2 Sheets-Sheet 1
MOLECULAR SIEVE SEPARATION OF HYDROCARBONS BY ALTERNATE PARAFFIN DISPLACEMENT PACKED COLUMN SYSTEM
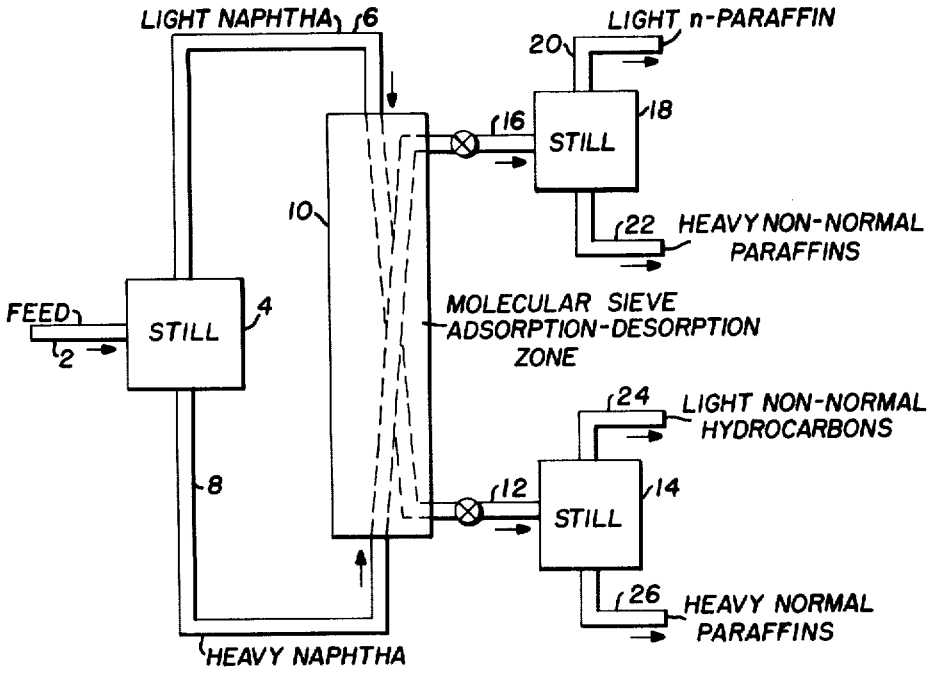
FIGURE-I
William J. Mattox
Charles N. Kimberlin, Jr. Inventors
Zigmond W. Wilchinsky
By Richard W. Nagel Attorney SEPARATION OF N-PARAFFIN FROM NON-N-PARAFFIN HYDROCARBONS BY ALTERNATE PARAFFIN DISPLACEMENT
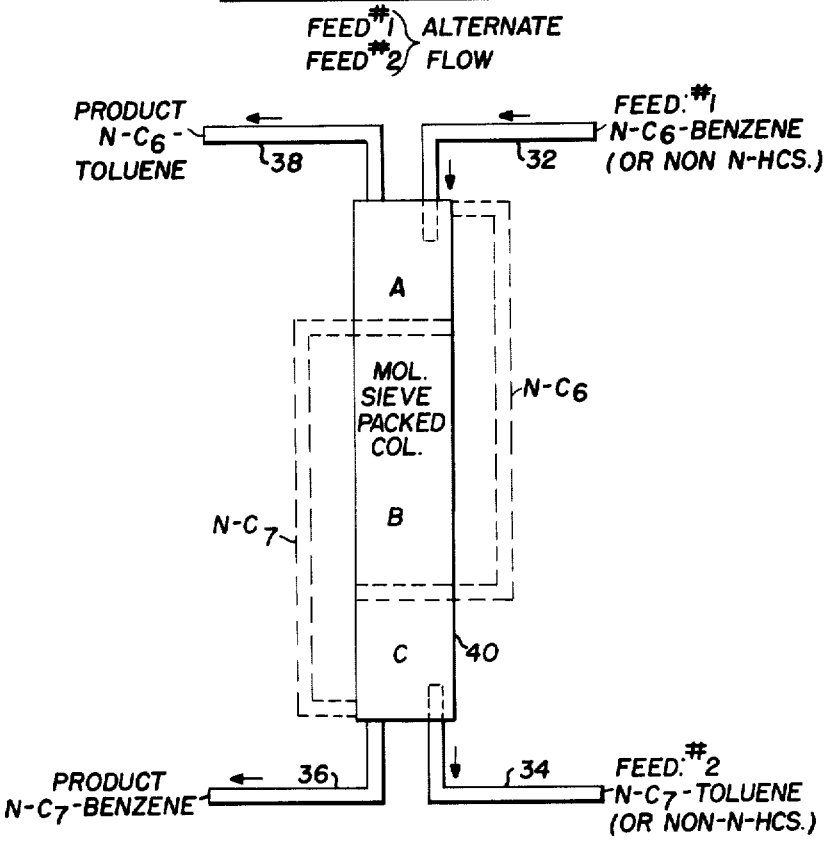
FIGURE-II
William J. Mattox
Charles N. Kimberlin, Jr. Inventors
Zigmond W. Wilchinsky
By Richard H. Nagel Attorney United States Patent Office Re. 25,980
Reissued Mar. 8, 1966

25,980

HYDROCARBON DESORPTION PROCESS

William Judson Mattox and Charles Newton Kimberlin, Jr., Baton Rouge, La., and Zigmond W. Wilchinsky, Westfield, N.J., assignors to Esso Research and Engineering Company, a corporation of Delaware Original No. 3,160,581, dated Dec. 8, 1964, Ser. No. 565,059, Feb. 13, 1956. Application for reissue June 25, 1965, Ser. No. 469,967
14 Claims. (Cl. 208—310)

Matter enclosed in heavy brackets [ ] appears in the original patent but forms no part of this reissue specification; matter printed in italics indicates the additions made by reissue.

The present invention relates to a process for separating and segregating straight chained hydrocarbons from mixtures thereof with branch chained and/or cyclic or aromatic hydrocarbons. More particularly, the present inventionl relates to the desorption of relatively straight chain, normal hydrocarbons from isomeric branch chained and cyclic compounds employing a class of natural or synthetic adsorbents termed, because of their ability to separate molecules on the basis of size, molecular sieves. Still more particularly, the present invention relates to an improved desorption process whereby the hydrocarbon adsorbed on the sieve is recovered in a manner considerably more efficient and economical than hitherto found possible.

It has been known for some time that certain zeolites, both naturally-occurring and synthetic, have the property of separating normal from isomeric branch chain hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3–5 Angstrom units to 12–15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e., the ability to adsorb a straight-chain hydrocarbon and exclude the branch chain isomers, are described in an article "Molecular Sieve Action of Solids" appearing in Quarterly Reviews, vol. III, pp. 293–330 (1949), and published by the Chemical Society (London).

The separation of normal from branch chain or aromatic hydrocarbons or mixtures, either for the purpose of enriching the mixture in branch chain, cyclic or aromatic components, or for isolating and recovering of the normal isomer, has become increasingly important in industry. Thus, in the preparation of high octane fuels, the presence of normal paraffins degrades the octane rating. On the other hand, in the manufacture of synthetic detergents such as alkyl aryl sulfonates, a straight chain nuclear alkyl substituent makes for better detergency characteristics than a branch chained substituent of the same number of carbon atoms. Many other examples may be cited.

Though it has in the past been proposed to make these separations, i.e., of normal from isomeric hydrocarbons and aromatics by molecular sieves, and though excellent and selective separations of one constituent have been realized, a serious problem has arisen when it was attempted to desorb and regenerate the molecular sieve or zeolite. Conventional means, such as steaming, purging with an inert gas such as nitrogen or methane, evacuation, all have proven unsatisfactory. In commercial applications it is necessary to employ a cyclic operation, i.e., an adsorption step followed by desorption and regeneration of the sieve, followed by a second adsorption step, etc. The desorption means enumerated above have been found unsatisfactory, and in some cases causing deterioration of the zeolite and marked decline in adsorptive capacity. For instance, in a process wherein a virgin naphtha fraction was treated with a synthetic molecular sieve having a pore diameter of 5 Angstroms to separate normal from branch chain constituents and thereby increase the octane number, and the sieves desorbed and regenerated between cycles by steam stripping following by nitrogen flushing, the sieves decreased in capacity to 59% of fresh capacity after only three cycles. Similarly, the effect of continued treatment of the sieves with steam at the high stripping temperatures of about 600 to 900° F. is to cause deterioration.

It is therefore the principal object of the present invention to set forth an improved method of desorbing and stripping hydrocarbons adsorbed in the uniform pores and cavities of certain natural or synthetic zeolites, customarily called molecular sieves.

It is also a purpose of the present invention to provide a desorption means which prolongs substantially the life of the molecular sieve.

It is a still further object of the present invention to desorb hydrocarbons from molecular sieves without employing temperatures substantially higher than the adsorption temperatures.

Other and further objects and advantages of the present invention will appear in the following more detailed description and claims.

In accordance with the present invention, the difficulties encountered in conventional methods of desorbing are avoided by displacement of adsorbed hydrocarbons, such as n-paraffins, with a slightly lower or slightly higher boiling hydrocarbon of the same type, the displacing hydrocarbon being desorbed in turn by the hydrocarbon adsorbed from the feed stream. Thus normal paraffins selectively adsorbed from a virgin naphtha cut by a molecular sieve adsorbent may be desorbed by elution with a normal paraffin in a different boiling range, the displacing hydrocarbon having either one or two more, or one or two less carbon atoms. This makes it possible to operate an isothermal cyclic process in which a virgin naphtha cut, for instance, is separated into a normal paraffin fraction and a fraction containing branched and cyclic hydrocarbons. Similarly, olefinic straight chain compounds may be separated from admixtures with other branch chained olefins and paraffins by adsorption, and then elution with olefins of somewhat higher or lower carbon content. In still another embodiment, aromatics may be similarly isothermally desorbed and recovered.

The process of the present invention will be more clearly understood when read in conjunction with the drawings which represent preferred embodiments thereof.

Turning to FIGURE I, a hydrocarbon feed, which may be a narrow cut virgin naphtha, a hydroformate and the like, is passed via line 2 into still 4 for separation into a heavy and a light naphtha fraction respectively. If a virgin naphtha boiling in the range of 150 to 310 is employed, the light fraction, withdrawn overhead through line 6, boils in the range of 150 to 235° F., and the heavy naphtha fraction, withdrawn downwardly through line 8, boils in the range of 235 to 310° F. The light fraction contains predominantly hydrocarbons of $C_6$ to $C_7$ carbon atoms, the heavy naphtha contains predominantly $C_8$ to $C_9$.

The light naphtha fraction is passed, preferably in the vapor state, to adsorption tower 10. The latter is packed with molecular sieve adsorbents of the type described hitherto. The diameter of the pores depends upon the size of the molecules which it is desired to retain. Thus, when it is desired to separate n-paraffins or n-olefins from their respective isomers, or from cyclic or aromatic compounds a molecular sieve having a pore diameter of 5 A. is desirable. This is suitable, for instance, in treating light virgin naphtha, hydroformates and the like. When it is desired to segregate larger molecules from still larger ones, i.e. in separating aromatics from one another, a larger pore diameter sieve, having up to 13–15 A. diameter may be required.

Tower 10 may be provided with means for maintaining heat therein, as closed steam coils and the like. Adsorption conditions include temperatures of 100 to 500° F., pressures of 200 to 400, and feed rates of 0.2 to 10 v./v./hr. The straight chain constituent, in the case of light naphtha principally $C_6$–$C_7$, is adsorbed, while the corresponding branch chain hydrocarbons pass through unchanged, are withdrawn through line 12, and discharged to still 14.

When no more normal hydrocarbons are being adsorbed, indicating the sieve cavities are filled, the desorption cycle begins. Heavy vaporized naphtha is passed into tower 10 through line 8 and the normal paraffins in the heavy naphtha, mostly $C_8$–$C_9$, now displace the n-paraffins initially lodged in the sieve. The displaced light n-paraffins and the unadsorbed heavy non-normal hydrocarbons in the feed admitted through line 8 are passed through line 16 into still 18 where, on distillation, the light n-paraffins are recovered overhead through line 20 and the heavy non-normal paraffins removed as a bottoms product through line 22.

The desorption cycle is again followed, without change in temperature in tower 10, by the adsorption cycle. Light naphtha is again admitted through line 6, the normal paraffin constituents thereof replacing the heavy normal paraffins in the sieve pores, and these latter, along with the unadsorbed light non-normal hydrocarbons, are withdrawn through line 12 and passed to still 14, where the light non-normal hydrocarbons may be withdrawn as an overhead fraction and the heavy n-paraffins as a bottoms product.

As an illustration of the above process, passing a light virgin naphtha over the sieve retains therein the n-$C_6$ and n-$C_7$ compounds, while the effluent passing to still 14 contains the branched and cyclic $C_6$ and $C_7$ hydrocarbons. These are collected and used as motor fuel. The adsorbed n-$C_6$ and n-$C_7$ are then desorbed with n-octane and n-nonane, the isoparaffins in the heavy naphtha as well as the normal hexanes and heptane being recovered and separated in still 18. When n-$C_8$–$C_9$ hydrocarbons appear in the effluent, the streams are again reversed.

A particularly desirable, and preferred embodiment of the present invention is shown diagrammatically in FIGURE II. This embodiment is particularly adapted to desorption with normal hydrocarbons differing by no more than 1–2 carbon atoms from the adsorbed n-paraffins, and wherein separation by distillation is difficult. Under normal circumstances, desorption, as shown in FIGURE I, usually continues until the desorbing material "breaks through" the column, i.e., appears in the effluent. The relatively small quantities of intermediate fractions may be recycled.

In accordance with the embodiment of the invention shown in FIGURE II, a relatively extended column is employed, packed with the molecular sieve material. A feed mixture, for instance, n-hexane and isohexanes or aromatics such as toluene, and preferably vaporized and dried, is passed into packed column 40 through line 32. The temperature in column 40 may be 200 to 300° F. The feed was charged to the top of column 40 and passed downwardly. Instead of continuing the adsorption half of the cycle until the sieves are completely saturated with n-$C_6$ as evidenced by n-$C_6$ appearing in the effluent withdrawn through line 36, the adsorption period is allowed to continue only till a certain length of the column is saturated, say 75–80% of the length. Then in the desorption step, the flow is reversed. The desorbing medium, such as n-heptane in admixture with isoheptane, benzene or toluene or the like, is passed upwardly in the vapor phase until again 75–80% of the length of the column is saturated with the desorbent, but in the opposite direction. That is, at the end of adsorbing cycle, sections A and B are saturated with n-$C_6$, while at the end of the desorbing portion of the cycle, sections B and C of the tower are saturated with n-heptane. The extent of saturation of the packing in the tower may readily be regulated by means of sample taps positioned in the adsorption column.

Thus, in accordance with this modification of the invention wherein neither adsorbent nor desorbent penetrates the column completely there is provided a clean separation of n-paraffins in the adsorbent from n-paraffins in the desorbent, and obviating the need for recycle of intermediate fractions, for there is no "break-through" of n-paraffins in the adsorbent or desorbent.

Thus in a cyclic operation employing molecular sieves having pore diameters of 5 A., a vaporized mixture containing 20% n-hexane and 80% benzene was passed into a packed column at 240° F. Charging continued until the n-hexane had passed down to a point about 80% the length of the column. In the subsequent portion of the cycle in which n-$C_6$ was desorbed with n-heptane dissolved in toluene, this desorbent was introduced at the bottom and allowed to pass upwardly to a point about 80% up the column. The thus desorbed n-hexane withdrawn through line 38 contained no n-$C_7$. The cycle was then reversed and the n-$C_7$ desorbed (by n-$C_6$) and recovered at the bottom of the tower in admixture with benzene. The n-paraffin-aromatic mixtures (n-$C_6$+toluene and n-$C_7$+benzene) are then readily separated by distillation. The same techniques may be employed to separate n-paraffins from iso-paraffins, cycloparaffins, etc.

The process of the present invention may be subjected to many variations without departure from its scope. Thus the process may also be adapted to provide a cyclic and isothermal process for removing normal olefins from branched chain hydrocarbons, cyclic or aromatic compounds. This is accomplished by employing a normal olefin having a slightly higher or slightly lower boiling point, i.e., differing by 1–2 carbon atoms. Since olefins have substantially different affinity coefficients of adsorption, it is not feasible to desorb a straight chain olefin with a straight chain paraffin of slightly higher or lower molecular weight.

Similarly, aromatics may be separated from mixtures with other hydrocarbons by molecular sieve adsorption. In this case, because of the substantially greater molecular radius of the aromatic molecule, a molecular sieve with a large pore diameter, say 8–15 A. would be employed. The adsorbed aromatic may then be desorbed and displaced with a somewhat lower or somewhat higher boiling aromatic, and the displacing aromatic is in turn desorbed by the aromatic adsorbed from the feed stream.

The process of the present invention may be further illustrated by the specific examples below:

EXAMPLE 1

Molecular sieves having a pore diameter of 5 A. were employed in a cyclic process for the separation of n-hexane and n-heptane from a mixture with other non-normal saturated hydrocarbons having six and seven carbon atoms per molecule. The separations were made in equipment similar to that described in FIGURE I. The fraction consisting of $C_6$ hydrocarbons was fed at a rate of 0.5 v./v./hr. to the top of a fixed-bed of the sieves heated to 240° F. When the sieve had approached nearly complete saturation with n-$C_6$, this feed was cut off and the fraction consisting of $C_7$ hydrocarbons was fed to the bottom of the sieve bed at the same volumetric rate and temperature until most of the adsorbed n-$C_6$ was desorbed and replaced with n-$C_7$. The cycle was then repeated. This operation provided two fractions, n-$C_6$ plus non-normal $C_7$ hydrocarbons and n-$C_7$ plus non-normal $C_6$ hydrocarbons, from which the n-$C_6$ and n-$C_7$ paraffins were readily separated in 98%+purity by distillation. The combined $C_6$–$C_7$ non-normal paraffins amounted to 75 vol. percent of the total fresh feed and had a research clear octane number of 82, a substantial increase over the 66 octane number of the feed. The intermediate fractions containing both $C_6$ and $C_7$ hydrocarbons and obtained at the end of each cycle amounted to about 1% and were recycled to the fractionation for $C_6$–$C_7$ separation.

After 10 cycles of the above isothermal operation, no decrease in adsorbent capacity was noted. However, when the $C_6$ and $C_7$ n-paraffins separated from a naphtha by the 5 A. molecular sieve were desorbed by steam stripping followed by nitrogen flushing, the sieve capacity for n-paraffin adsorption decreased to 59% of fresh capacity after only three cycles.

EXAMPLE 2

Employing the cyclic adsorption-desorption procedure described in connection with FIGURE II, the $C_6$ and $C_7$ naphtha fractions used in Example 1 were separated into n-$C_6$ and n-$C_7$ and the corresponding non-normal fractions. Temperature and feed rate conditions were the same as in Example 1 but only about 80% of the full sieve capacity was used for each n-paraffin adsorption. Thus, the "break-through" of n-paraffins was avoided and no intermediate $C_6$–$C_7$ cuts were produced which required recycle. The sieve capacity maintained in this cyclic, isothermal operation was equivalent to that of the fresh sieves.

EXAMPLE 3

In the separation of n-paraffins from a $C_6$–$C_7$ hydrocarbon fraction with 5 A. molecular sieves at 240° F., propane was evaluated as a desorbing or replacement paraffin. Desorption of the n-$C_6$ and n-$C_7$ with this paraffin was slow and inefficient, only 20% of the total adsorbed paraffins being displaced in one hour. Under the same conditions of temperature and space velocity n-$C_8$ or $C_9$ hydrocarbons effected substantially complete displacement in 20 minutes. This test illustrates the necessity for avoiding too wide a variation in molecular weight between the adsorbed and desorbing or replacement hydrocarbons, if of the same type.

The process of the present invention is particularly adapted to be employed in association with various means for upgrading virgin naphthas to form high octane motor fuels. One such means is hydroforming, wherein virgin naphthas containing substantial amounts of n-paraffins are treated in the presence of a suitable catalyst such as platinum with hydrogen at elevated temperatures and pressures to form a "hydroformate" containing a substantial proportion of aromatics. Treatment of the hydroformate with the molecular sieves results in substantial enhancing of the octane value of the product, because the unreacted n-paraffins are removed thereby. These may then be recovered from the sieve by the process of the present invention and recycled to the hydroforming zone for further conversion.

What is claimed is:

[1. In a process for selectively separating straight chain hydrocrabons selected from the class consisting of olefins and paraffins from admixture with one another and with branched chain and cyclic hydrocarbons and wherein a mixture containing a member of such class is passed into a molecular sieve adsorption zone adapted to adsorb straight chain hydrocarbons but exclude branched chain and cyclic hydrocarbons, the improvement which comprises desorbing olefins adsorbed on said molecular sieves with a straight chain olefin hydrocarbon differing by at least one and not more than two carbon atoms from the olefin adsorbed on said molecular sieves and desorbing normal paraffinic hydrocarbons from said molecular sieves with a straight chain paraffinic hydrocarbon differing by at least one and not more than two carbon atoms from the paraffinic hydrocarbons adsorbed on said molecular sieves.]

[2. The process of claim 1 wherein said first-named hydrocarbons are normal paraffins and said molecular sieves have a pore diameter of about 5 angstroms.]

[3. The process of claim 1 wherein said first-named hydrocarbons are straight chain olefins and said molecular sieves have a pore diameter of about 5 angstroms.]

4. An improved isothermal process for separating straight chain paraffinic hydrocarbons from mixtures with other hydrocarbons which comprises passing a vaporized stream of said mixture into a molecular sieve adsorption zone, said sieves having a pore diameter of about 5 angstroms, maintaining a temperature of from about 100–500° F. in said zone, withdrawing unadsorbed non-normal hydrocarbons from said zone while adsorbing straight chain hydrocarbons, thereafter passing a vaporized stream comprising normal paraffins differing by at least one and not more than two carbon atoms from said adsorbed paraffins into said zone, whereby said first-named normal paraffins are desorbed and said second-named paraffins are adsorbed, maintaining substantially the same temperature level in the adsorption and desorption stages, withdrawing said desorbed hydrocarbons, and thereafter repeating said cycle.

5. The process of claim 4 wherein said paraffin feeds are dried prior to passage into the adsorption zone.

6. An improved isothermal process for upgrading a naphtha which comprises passing the latter to a distillation zone, separately withdrawing a light fraction and a heavy fraction each comprising normal paraffins and non-normal hydrocarbons, said light and heavy normal paraffins comprising hydrocarbons differing by at least one and not more than two carbon atoms, passing said vaporized light fraction to a molecular sieve adsorption zone, adsorbing said light normal paraffins, withdrawing unadsorbed light non-normal hydrocarbons, thereafter passing said vaporized heavy fraction into said zone, adsorbing said heavy normal paraffins, withdrawing light normal paraffins and heavy non-normal hydrocarbons from said zone, passing said mixture to a separation zone, thereafter passing said light fraction into said adsorption zone, withdrawing a mixture of heavy normal paraffins and light non-normal hydrocarbons, passing said mixture to a separation zone, and recovering separate streams comprising light normal, heavy normal, light non-normal and heavy non-normal hydrocarbons respectively.

7. The process of claim 6 wherein said initial naphtha boils in the range of from about 150–310° F. and comprises $C_6$–$C_9$ hydrocarbons, said light fraction comprising $C_6$–$C_7$ and said heavy fraction $C_8$–$C_9$ hydrocarbons.

8. An improved isothermal process for separating normal paraffinic hydrocarbons differing in molecular weight by 1–2 carbon atoms which comprises passing a vaporized stream comprising normal and non-normal paraffinic hydrocarbons into one end of an extended molecular sieve adsorption zone, saturating a major portion but less than the total volume of said zone with adsorbed normal paraffinic hydrocarbons, thereafter passing into the other end of said zone a vaporized stream comprising a normal paraffinic hydrocarbon differing by no more than two carbon atoms from said first-named normal paraffinic hydrocarbon, saturating a major portion but less than the total volume of said zone with adsorbed normal paraffinic hydrocarbon from said last-named stream, and separately withdrawing normal hydrocarbon-comprising streams for each end of said zone.

9. An improved isothermal process for separating normal olefinic hydrocarbons differing in molecular weight by one to two carbon atoms which comprises passing a vaporized stream comprising said normal olefinic hydrocarbons and non-normal hydrocarbons into one end of an extended molecular sieve adsorption zone, saturating a major portion but less than the total volume of said zone with adsorbed normal olefinic hydrocarbons, thereafter passing into the other end of said zone a vaporized stream comprising a normal olefinic hydrocarbon differing by no more than two carbon atoms from said first-named normal olefinic hydrocarbon, saturating a major portion but less than the total volume of said zone with adsorbed normal olefinic hydrocarbon from said last-named stream, and separately withdrawing normal olefinic hydrocarbon comprising streams from each end of said zone.

10. The process for treating two fluid hydrocarbon mixtures of differing boiling range, each of which comprises straight chain and non-straight chain components, to separate the straight chain components therefrom which comprises: (1) flowing the first of said mixtures in contact with a solid granular adsorbent consisting essentially of a partially dehydrated zeolitic metallo alumino silicate having substantially uniform intracrystalline pores of about 5 A. in diameter, said adsorbent having adsorbed thereon straight chain components of the second of said mixtures, whereby the adsorbed straight chain components of said second mixture are desorbed and the straight chain components of said first mixture are adsorbed, and there is obtained a first effluent comprising the non-straight chain components of said first mixture and the desorbed straight chain components of said second mixture; (2) separating the said first effluent from the adsorbent; (3) then flowing said second mixture in contact with said adsorbent, whereby the adsorbed straight chain components of said first mixture are desorbed and the straight chain components of said second mixture are adsorbed, and there is obtained a second effluent comprising the non-straight chain components of said second mixture and the desorbed straight chain components of said first mixture; (4) separating the said second effluent from the adsorbent; (5) during said steps (1) and (3) controlling the relative flow rates of said first and second mixtures so that substantially equivalent amounts of straight chain components are adsorbed in each of said steps; and (6) treating said first and second effluents separately to separate therefrom the straight chain components thereof.

11. The process of claim 10 wherein the compositions of said first and second mixtures are such that in steps (1) and (3) substantially equivalent amounts of straight chain components are adsorbed, and in step (5), the said flow rates are controlled so as to be substantially equal.

12. The process for treating two hydrocarbon mixtures of different boiling range, each of which consists essentially of straight chain and non-straight chain hydrocarbons having boiling points within the gasoline boiling range, which comprises: (1) flowing the lower boiling mixture in contact with a solid granular adsorbent consisting essentially of a partially dehydrated zeolitic metallo alumino silicate having substantially uniform intracrystalline pores of about 5 A. in diameter, said adsorbent having adsorbed thereon straight chain components of the higher boiling mixture, whereby said adsorbed straight chain components of said higher boiling mixture are desorbed and the straight chain components of the lower boiling mixture are adsorbed, and there is obtained a first effluent comprising the non-straight chain components of the lower boiling mixture and the desorbed straight chain components of the higher boiling mixture; (2) separating said first effluent from said adsorbent; (3) then flowing said higher boiling mixture in contact with the adsorbent, whereby the adsorbed straight chain components of the lower boiling mixture are desorbed and the straight chain components of the higher boiling mixture are adsorbed, and there is produced a second effluent comprising the non-straight chain components of the higher boiling mixture and desorbed straight chain components of the lower boiling mixture; (5) during steps (1) and (3) controlling the relative flow rates of said lower boiling and higher boiling mixtures so that substantially equivalent amounts of straight chain components are adsorbed in each of said steps; and (6) separately distilling said first and second effluents to separate the straight chain components therefrom.

13. The process of claim 12 wherein said hydrocarbon mixtures are obtained by distilling a single gasoline boiling range mixture of relatively wide boiling range into a lower boiling fraction and a higher boiling fraction.

14. The process of claim 12 wherein the compositions of said first and second mixtures are such that in steps (1) and (3) substantially equivalent amounts of straight chain components are adsorbed, and, in step (5), the said flow rates are controlled so as to be substantially equal.

*15. In a process for selectively separating straight chain hydrocarbons from the class consisting of olefins and paraffins from admixture with branched-chain and cyclic hydrocarbons and wherein a mixture containing a member of such class is passed into a molecular sieve adsorption zone adapted to adsorb straight chain hydrocarbons but exclude branched-chain and cyclic hydrocarbons, the improvement which comprises desorbing said hydrocarbon which has been adsorbed on said molecular sieve with a straight chain hydrocarbon having the same degree of saturation as the adsorbed hydrocarbon and differing by at least one and not more than two carbon atoms from the hydrocarbon adsorbed on said molecular sieve.*

*16. In a process for selectively separating straight chain paraffins from admixture with branched-chain and cyclic hydrocarbons wherein a straight chain paraffin containing mixture is passed into a molecular sieve adsorption zone, said molecular sieve having a pore diameter of about 5 Angstroms wherein straight chain paraffins are adsorbed and branched-chain and cyclic hydrocarbons excluded, the improvement which comprises desorbing paraffins adsorbed on said molecular sieve with a straight chain paraffinic hydrocarbon differing by at least one and not more than two carbon atoms from the straight chain paraffinic hydrocarbon adsorbed on said molecular sieve.*

*17. In a process for selectively separating straight chain olefins from admixture with branched-chain and cyclic hydrocarbons wherein a straight chain olefin containing mixture is passed into a molecular sieve adsorption zone, said molecular sieve having a pore diameter of about 5 Angstroms wherein straight chain olefins are adsorbed and branched-chain and cyclic hydrocarbons excluded, the improvement which comprises desorbing olefins adsorbed on said molecular sieve with a straight chain olefinic hydrocarbon differing by at least one and not more than two carbon atoms from the straight chain olefinic hydrocarbon adsorbed on said molecular sieve.*

(References on following page)

References Cited by the Examiner

The following references cited by the Examiner, are of record in the patented file of this patent or the original patent.

UNITED STATES PATENTS

| | | | |
|---|---|---|---|
| 2,413,134 | 12/1946 | Barrer | 23—110 |
| 2,425,535 | 8/1947 | Hilbshman | 260—676 |

| | | | |
|---|---|---|---|
| 2,585,490 | 2/1952 | Olsen | 260—674 |
| 2,586,889 | 2/1952 | Vesterdal et al. | 208—310 |
| 2,620,363 | 12/1952 | Hibshman | 260—676 |
| 2,728,800 | 12/1955 | Manne et al. | 260—666 |
| 2,776,250 | 1/1957 | Capell et al. | 208—310 |
| 2,818,455 | 12/1957 | Ballard et al. | 208—676 |

ALPHONSO D. SULLIVAN, *Primary Examiner.*